(12) United States Patent
Drader

(10) Patent No.: US 8,462,968 B2
(45) Date of Patent: Jun. 11, 2013

(54) SHARED COIL FOR INDUCTIVE CHARGING AND HEARING-AID-COMPLIANCE REQUIREMENTS IN MOBILE PHONES

(75) Inventor: Marc Drader, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 251 days.

(21) Appl. No.: 12/818,574

(22) Filed: Jun. 18, 2010

(65) Prior Publication Data

US 2011/0311084 A1 Dec. 22, 2011

(51) Int. Cl.
*H04R 25/00* (2006.01)
(52) U.S. Cl.
USPC .......................................... 381/315; 381/323
(58) Field of Classification Search
None
See application file for complete search history.

(56) References Cited

U.S. PATENT DOCUMENTS

| | | | | |
|---|---|---|---|---|
| 6,118,882 | A * | 9/2000 | Haynes | 381/374 |
| 7,206,426 | B1 * | 4/2007 | Julstrom et al. | 381/331 |
| 8,035,255 | B2 * | 10/2011 | Kurs et al. | 307/104 |
| 2004/0145342 | A1 | 7/2004 | Lyon | |
| 2005/0263596 | A1 | 12/2005 | Nelson | |
| 2007/0088504 | A1 | 4/2007 | Jantunen | |
| 2007/0195977 | A1 | 8/2007 | Fink | |
| 2008/0130867 | A1 | 6/2008 | Bowen | |
| 2009/0010462 | A1 * | 1/2009 | Ekchian et al. | 381/312 |
| 2009/0111541 | A1 | 4/2009 | Kim et al. | |
| 2009/0143097 | A1 | 6/2009 | Wilson | |
| 2009/0296947 | A1 * | 12/2009 | Duron et al. | 381/71.6 |
| 2010/0001683 | A1 | 1/2010 | Huang | |
| 2010/0308668 | A1 * | 12/2010 | Rofougaran et al. | 307/149 |
| 2010/0308767 | A1 * | 12/2010 | Rofougaran et al. | 320/108 |
| 2010/0309078 | A1 * | 12/2010 | Rofougaran et al. | 343/776 |
| 2010/0311356 | A1 * | 12/2010 | Rofougaran et al. | 455/91 |
| 2010/0329491 | A1 * | 12/2010 | Johansen | 381/315 |
| 2011/0311084 | A1 * | 12/2011 | Drader | 381/315 |

FOREIGN PATENT DOCUMENTS

EP 1942570 A1 7/2008

OTHER PUBLICATIONS

European Patent Application No. 10166553.7 Search Report dated Mar. 24, 2011.

* cited by examiner

*Primary Examiner* — Marlon Fletcher
(74) *Attorney, Agent, or Firm* — Louis B. Allard; Borden Ladners Gervais LLP

(57) ABSTRACT

A mobile communication device that is compliant with the Hearing Aid Compliance Act. The device includes a coil and circuitry that can couple, through electromagnetic induction, the output of an audio codec of the device to a hearing aid. The coil and circuitry can also be used to charge the battery of the device. The coil and circuitry can further be used, through electromagnetic induction, to transfer energy from the battery of the device to the battery of the hearing aid to charge the battery of the hearing aid.

14 Claims, 6 Drawing Sheets

SHARED COIL FOR INDUCTIVE CHARGING AND HEARING-AID-COMPLIANCE REQUIREMENTS IN MOBILE PHONES

FIELD OF THE DISCLOSURE

The present disclosure relates generally to mobile communication devices. More particularly, the present disclosure relates to hearing aid compliant mobile communication devices.

BACKGROUND OF THE DISCLOSURE

Legislation in the United States of America, namely, the Hearing Aid Compatibility (HAC) Act, requires that certain telephones manufactured or imported in the country be compatible with telecoil-equipped hearing aids (a telecoil is a small coil of wire designed to improve the sound quality experienced by a hearing impaired user while using a HAC-compliant telephone). The telecoil generates an electrical signal upon being subjected to a varying magnetic field produced by the HAC-compliant telephone; the electrical signal generated in the telecoil is transformed by the hearing aid into an acoustic signal, which is provided to the user. In order for mobile communication devices to be HAC-compliant, they have to include special circuitry and a coil that can generate the varying magnetic field signal that is detected by the telecoil of the hearing aid. Such coils can be costly and typically take up a lot of space in the mobile communication device.

Further, there is a desire to provide mobile communication devices with electromagnetic induction charging capabilities. In order to do so, the mobile communication devices need to be equipped with a dedicated charge coil and related circuitry that can generate a charge current upon being subjected to an electromagnetic induction charge signal.

Improvements in HAC-compliant mobile communication devices and in mobile communication devices that can be charged by electromagnetic induction are therefore desired.

BRIEF DESCRIPTION OF THE DRAWINGS

Embodiments of the present disclosure will now be described, by way of example only, with reference to the attached Figures, wherein.

DETAILED DESCRIPTION

Figure 1:
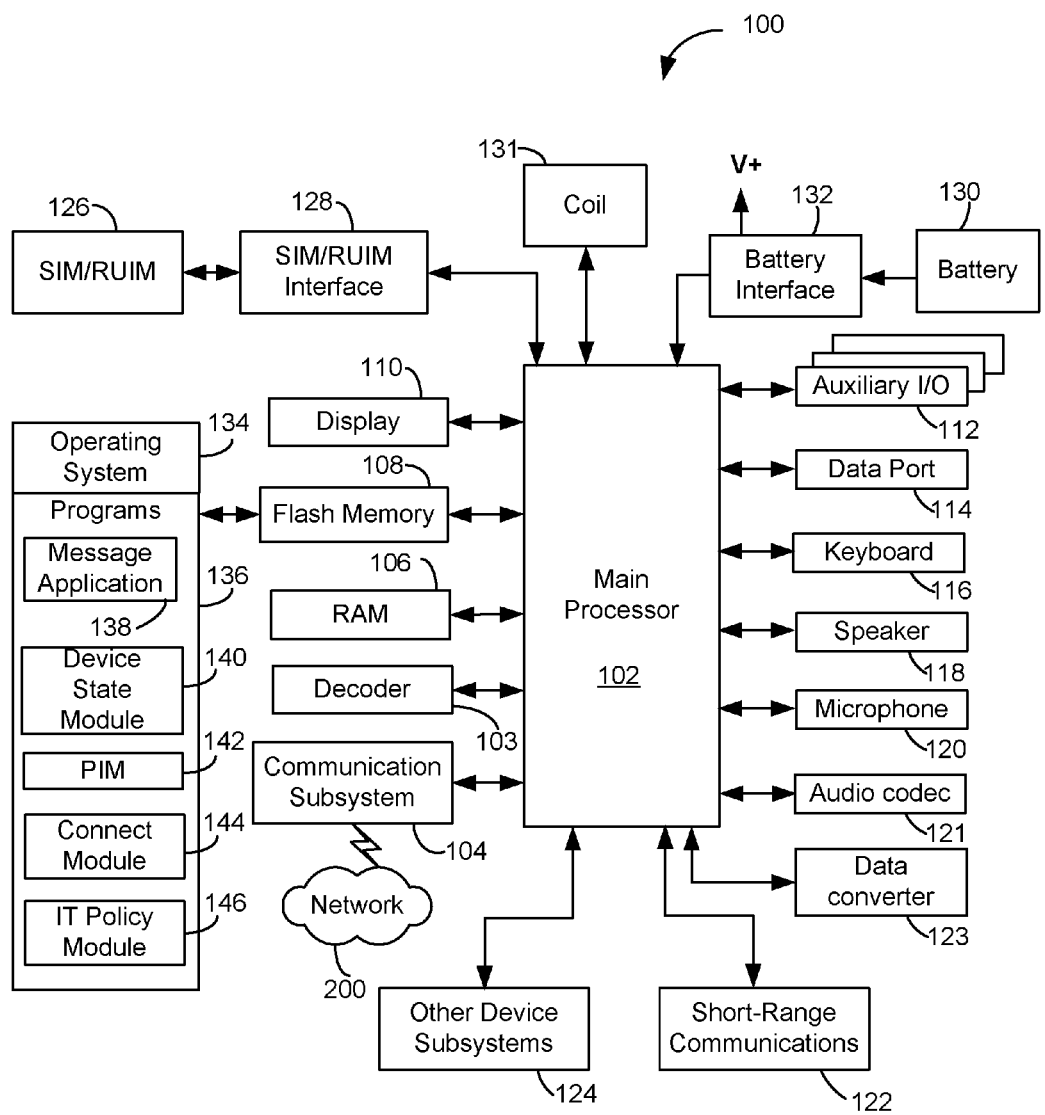
FIG. 1 shows a block diagram example of a mobile communication device.

Generally, the present disclosure provides a method and system to couple, through electromagnetic induction, an electrical energy source of a mobile communication device to an electromagnetic induction charger to charge the electrical energy source, or to a hearing aid to charge a battery of the hearing aid. Further, the present disclosure provides a method and system to couple, still through electromagnetic induction, an electrical output signal of an audio codec of the mobile communication device to the hearing aid. The method and system of the present invention make use of a single coil formed in the mobile communication device to couple the mobile communication device to the electromagnetic induction charger or to the hearing aid.

In a first aspect of the invention, there is provided a mobile communication device that comprises an electrical energy source; a data converter to convert input data into an electrical output signal; a coil; and circuitry configurable to electrically connect the coil to the electrical energy source to charge the electrical energy source upon the coil being subjected to a mobile communication device electromagnetic induction charge signal, the circuitry also configurable to provide the electrical output signal of the data converter to the coil, the coil to produce, as a function of the electrical output signal, an electromagnetic induction output signal to be received by a peripheral device upon the coil being inductively coupled to the peripheral device. One example of a "peripheral device" is a hearing aid. In general, an element is "configurable to" perform a function if the element is capable of performing the function; the element may be configurable to perform the function under particular conditions or at particular times, for example, or the element may be configurable to perform the function under any conditions or at any time. The mobile communication device electromagnetic induction charge signal can generate a time-varying electrical signal in the coil, the circuitry can include a rectifier to convert the time-varying electrical signal into a direct current electrical signal to charge the electrical energy source. The data converter can be an audio codec and the peripheral device can be a hearing aid. The circuitry can include an audio amplifier to amplify the electrical output signal of the audio codec.

The circuitry can be configurable to electrically connect the electrical energy source to the coil to provide a peripheral device electromagnetic induction charge signal to charge the peripheral device upon the peripheral device being inductively coupled to the coil. The circuitry can include a DC to AC converter to convert a direct current signal from the electrical energy source into the peripheral device electromagnetic induction charge signal.

The circuitry can include a switching device to electrically connect the coil to the electrical energy source, and to electrically connect the data converter to the coil. The switching device includes a transistor, which can include a field-effect transistor.

The circuitry can include detection and control circuitry connected to the coil, the detection and control circuit to generate a detection signal as a function of a detection of the peripheral device or of the mobile communication device electromagnetic induction charge signal, the detection and control circuitry also to control the switching device as a function of the detection signal. The circuitry can include a sensor to detect the peripheral device and to detect the mobile communication device electromagnetic charge signal; and detection and control circuitry connected to the sensor, the detection and control circuit to generate a detection signal as a function of a detection of the peripheral device or of the mobile communication device electromagnetic induction charge signal, the detection and control circuitry also to control the switching device as a function of the detection signal. The sensor can include a Hall effect sensor. The peripheral device can be a biometric monitor having recorded thereon biometric data, the circuitry configurable to receive the biometric data from the biometric sensor and to store the biometric data in a memory of the device.

In a second aspect of the disclosure, there is provided a method of coupling a mobile communication device to a hearing aid or to an electromagnetic induction charger, the mobile communication device comprising an electrical energy source, an audio codec, and a coil. The method comprises: detecting one of a mobile communication device electromagnetic charge signal generated by the electromagnetic induction charger and a hearing aid identification electromagnetic induction signal generated by the hearing aid; upon detection of the mobile communication device electromagnetic charge signal, electrically connecting the coil to the electrical energy source to provide a charge current to the electrical energy source to charge the electrical energy source, the charge current being a function of an electromagnetic induction current generated in the coil by the mobile communication device electromagnetic charge signal; and upon detection of the hearing aid identification electromagnetic induction signal, electrically connecting the coil to the audio codec to provide an electrical output signal of the audio codec to the coil to generate an electromagnetic induction output signal to be received by the hearing aid.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a mobile wireless communication device, which can also be referred to as a mobile communication device (MCD) or as a mobile device. Examples of applicable MCDs include cellular phones, cellular smart-phones, handheld wireless communication devices and the like.

The mobile device is a two-way communication device with data communication capabilities including the capability to communicate with other mobile devices or computer systems through a network of transceiver stations. The mobile device also has the capability to allow voice communication. Depending on the functionality provided by the mobile device, it may be referred to as a data messaging device, a two-way pager, a cellular telephone with data messaging capabilities, a wireless Internet appliance, or a data communication device. To aid the reader in understanding the structure of the MCD, reference will now be made to FIG. 1.

Shown in FIG. 1, is a block diagram of an exemplary embodiment of a mobile communication device 100. The mobile communication device 100 includes a number of components such as a main processor 102 that controls the overall operation of the mobile communication device 100. Communication functions, including data and voice communications, are performed through a communication subsystem 104. Data received by the mobile communication device 100 can be decompressed and decrypted by decoder 103, operating according to any suitable decompression techniques (e.g. YK decompression, and other known techniques) and encryption techniques (e.g. using an encryption techniques such as Data Encryption Standard (DES), Triple DES, or Advanced Encryption Standard (AES)). The communication subsystem 104 receives messages from, and sends messages to, a wireless network 200. In this exemplary embodiment of the mobile communication device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile communication device 100 is a GSM/GPRS wireless network in one exemplary implementation, other wireless networks may also be associated with the mobile communication device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The display 110 can include a touch-sensitive display.

Some of the subsystems of the mobile communication device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile communication device 100 can send and receive communication signals over the wireless network 200 after required network registration or activation procedures have been completed. Network access is associated with a subscriber or user of the mobile communication device 100. To identify a subscriber, the mobile communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the mobile communication device 100 and to personalize the mobile communication device 100, among other things. Without the SIM/RUIM card 126, the mobile communication device 100 is not fully operational for communication with the wireless network 200. By inserting the SIM/RUIM card 126 into the SIM/RUIM interface 128, a subscriber can access all subscribed services. Services may include: web browsing and messaging such as e-mail, voice mail, Short Message Service (SMS), and Multimedia Message Service (MMS). More advanced services may include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile communication device. The SIM/RUIM card 126 may store additional subscriber information for a mobile communication device as well, including datebook (or calendar) data and recent call data. Alternatively, user identification data and other data items can also be programmed into the flash memory 108.

The mobile communication device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile communication device 100. Although current technology makes use of a battery, future technologies such as micro fuel cells or capacitor-based power supplies may provide the power to the mobile communication device 100. As will be understood by the skilled worker, batteries, micro fuel cells, capacitor-based based power supplies, or any other device that can produce an electrical output usable by the mobile communication device 100, can all be referred to as electrical energy sources.

The mobile communication device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile communication device 100 during its manufacture. Other software applications include a message application 138 that can be any suitable software program that allows a user of the mobile communication device 100 to send and receive electronic messages. Various alternatives exist for the message application 138 as is well known to those skilled in the art. Messages that have been sent or received by the user are typically stored in the flash memory 108 of the mobile communication device 100 or some other suitable storage element in the mobile communication device 100. In at least some embodiments, some of the sent and received messages may be stored remotely from the device 100 such as in a data store of an associated host system that the mobile communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile communication device 100 is turned off or loses power.

The PIM 142 includes functionality for organizing and managing data items of interest to the user, such as, but not limited to, e-mail, contacts, calendar events, appointments, and task items. The PIM 142 can also organize and manage any voice mails recorded on the mobile communication device 100. A PIM application has the ability to send and receive data items via the wireless network 200. PIM 142 data items may be seamlessly integrated, synchronized, and updated via the wireless network 200 with the mobile communication device subscriber's corresponding data items stored in, or accessible by, a host computer system. This functionality creates a mirrored host computer on the mobile communication device 100 with respect to such items. This can be particularly advantageous when the host computer system is the mobile communication device subscriber's office computer system.

The mobile communication device 100 also includes a connect module 144, and an information technology (IT) policy module 146. The connect module 144 implements the communication protocols that are required for the mobile communication device 100 to communicate with the wireless infrastructure and any host system, such as an enterprise system, that the mobile communication device 100 is authorized to interface with.

The connect module 144 includes a set of application programming interfaces (APIs) that can be integrated with the mobile communication device 100 to allow the mobile communication device 100 to use any number of services associated with the enterprise system. The connect module 144 allows the mobile communication device 100 to establish an end-to-end secure, authenticated communication pipe with the host system. A subset of applications for which access is provided by the connect module 144 can be used to pass information technology (IT) policy commands from the host system to the mobile communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the mobile communication device 100. These software applications can be third party applications, which are added after the manufacture of the mobile communication device 100. Examples of third party applications include games, calculators, utilities, etc.

The additional applications can be loaded onto the mobile communication device 100 through at least one of the wireless network 200, the auxiliary input/output (I/O) subsystem 112, the data port 114, the short-range communications subsystem 122, or any other suitable device subsystem 124. This flexibility in application installation increases the functionality of the mobile communication device 100 and may provide enhanced on-device functions, communication-related functions, or both. For example, secure communication applications may enable electronic commerce functions and other such financial transactions to be performed using the mobile communication device 100.

The data port 114 enables a subscriber to set preferences through an external device or software application and extends the capabilities of the mobile communication device 100 by providing for information or software downloads to the mobile communication device 100 other than through a wireless communication network. The alternate download path may, for example, be used to load an encryption key onto the mobile communication device 100 through a direct and thus reliable and trusted connection to provide secure device communication.

The data port 114 can be any suitable port that enables data communication between the mobile communication device 100 and another computing device. The data port 114 can be a serial or a parallel port. In some instances, the data port 114 can be a USB port that includes data lines for data transfer and a supply line that can provide a charging current to charge the battery 130 of the mobile communication device 100.

The short-range communications subsystem 122 provides for communication between the mobile communication device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 may be an alphanumeric keyboard, a telephone-type keypad, or both. Alternatively, instead of having a keyboard 116, keyboard functionality can be provided to the user through a touch-sensitive display that may be included in the display 110. Other types of keyboards may also be used. A composed item may be transmitted over the wireless network 200 through the communication subsystem 104.

For voice communications, the overall operation of the mobile communication device 100 is substantially similar, except that the received signals are output to the speaker 118, and signals for transmission are generated by the microphone 120. Alternative voice or audio I/O subsystems, such as a voice message recording subsystem, can also be implemented on the mobile communication device 100. Although voice or audio signal output is accomplished primarily through the speaker 118, the display 110 can also be used to provide additional information such as the identity of a calling party, duration of a voice call, or other voice call related information.

The mobile communication device 100 also includes a coil 131 that can be operationally connected to the battery 130. That is, the coil 131 can be used, as will be described below, to charge the battery 130 by electromagnetic induction upon the coil 131 being subjected to a mobile communication device electromagnetic induction charge signal, which is a time-varying magnetic field. Alternatively, as will also be described below, the battery 130 and the coil 131 can be operationally connected to generate an electromagnetic induction charge signal to charge a hearing aid or, more generally, a peripheral device. Further, the coil 131 can also be operationally connected to an audio codec 121 or, more generally, to a data converter 123. The audio codec 121 is a particular type of data converter. The audio codec 121 can convert audio data received by the communication system 104, or stored in the mobile communication device 100 (e.g., as a voice mail message), into an electrical output signal that can be provided to the coil 131. In turn, the coil 131 can output an electromagnetic induction signal to be received by the telecoil of a hearing aid upon the coil 131 being inductively coupled to the telecoil of the hearing aid. The data converter 123 can represent any type of converter that can convert data stored in, or transiting through, the mobile communication device 100, into an electrical output signal, which can be used to generate an electromagnetic induction signal to be coupled to a peripheral device. The appellation "peripheral device" includes any device that can be coupled to the mobile communication device 100 through electromagnetic induction. As such peripheral devices include, amongst others, induction coil equipped: hearing aids, biometric monitors or sensors, that is, devices that can measure and store biometric data of a user (pulse rate, breathing rate, etc) in a memory of the mobile communication device 100, portable electronic devices, locks (e.g., door locks), etc.

At FIG. 1, the coil 131 is shown as connected to the main processor 102, which is itself connected to the audio codec 121, the data converter 123, and to the battery 130 via the battery interface 132. The depiction in FIG. 1 is to be understood as meaning that any flow of any type of signal between the coil 131 and the audio codec 121, the data converter 123, and the battery 130 can be controlled by the main processor 102. For example, the main processor 102 can control the flow of an electromagnetic induction charge signal to charge a peripheral device. Further details regarding the control of signals flowing between the coil 131 and the audio codec 121, the data converter 123, and the battery 130, will be presented below.

The scope of the present disclosure encompasses inductively coupling (that is, coupling through electromagnetic induction), through a coil formed in a mobile communication device, the output signal of an audio codec, or data converter, also formed in the mobile communication device, to a hearing aid, or to a peripheral device. The scope of the present disclosure also encompasses inductively coupling an electromagnetic induction charge signal to a battery of the mobile communication device, through a coil formed in a mobile communication device, to charge the battery of the mobile communication device. The scope of the present disclosure further encompasses inductively coupling an electromagnetic induction charge signal from a mobile communication device, through a coil formed therein, to a hearing aid, or peripheral device, to charge a battery of the hearing aid or peripheral device. Further yet, the scope of the present disclosure encompasses inductively coupling, through a coil formed in a mobile communication device, a data signal (communication signal) from a peripheral device to the mobile communication device. Furthermore, the present disclosure encompasses two-way communication between a mobile communication device and a peripheral device, through inductive coupling. That is, a communication signal can flow from the peripheral device to the mobile communication device, or from the mobile communication device to the peripheral device. As will be understood by the skilled worker, such two-way communication between a mobile communication device and a peripheral device can be limited to a short spacing between the mobile communication device and the peripheral device, and to low data transfer speeds; however, the close proximity required for such two-way communication makes for fairly secure data transfer.

Figure 2:
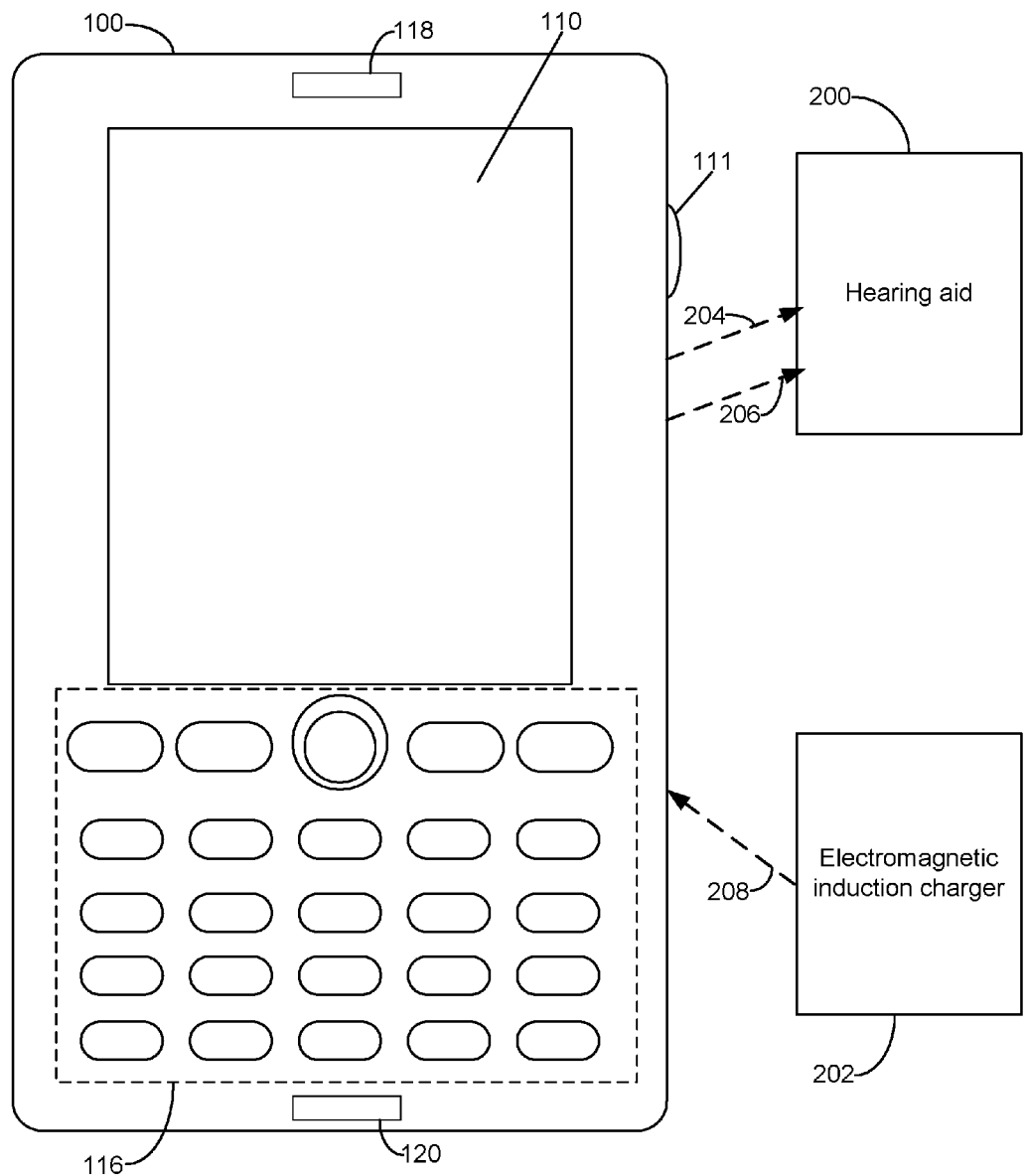
FIG. 2 shows the mobile communication device of FIG. 1, and an example of how it can interact with a hearing aid and an electromagnetic induction charger.

FIG. 2 shows the mobile communication device 100 with its keyboard 116, microphone 120, display 110, speaker 118, and an on/off switch 111. Although not shown at FIG. 2, the mobile communication device also includes the coil 131, which is operationally connectable to the battery and to the audio codec of the mobile communication device 100. FIG. 2 also shows a hearing aid 200 and an electromagnetic induction charger 202, which can be any device that produces time-varying magnetic field energy that can be harvested by the coil 131 to charge the battery of the mobile communication device 100. The dotted arrow 204 indicates that the mobile communication device 100 can be coupled, through the coil 131, to the hearing aid 200 (the hearing aid 200 being equipped with a telecoil), to provide the hearing aid 200 an electromagnetic induction signal that can be transduced by the hearing aid into an acoustic signal (the hearing aid has a speaker that transduces the electrical signal into an acoustic signal). Such coupling may support making the mobile communication device 100 compatible with various standards, regulations or guidelines, such as the Hearing Aid Compliance regulations in the United States of America. In some embodiments, there could be two-way communication between the mobile communication device 100 and the hearing aid 200 in order to pass therebetween, as an example, identification information (e.g., hearing aid/mobile communication device model and specifications, in order for the hearing aid/mobile communication device to set optimum communication parameters).

The dotted arrow 206 indicates that the mobile communication device 100 can be coupled, through its coil 131, to the hearing aid 200, to provide the hearing aid 200 an electromagnetic induction charge signal to charge the battery of the hearing aid 200. The dotted arrow 208 indicates that the mobile communication device 100 can be coupled, through its coil 131, to the electromagnetic induction charger 202 to receive from the electromagnetic induction charger an electromagnetic induction charge signal to charge the battery of the mobile communication device 100.

Figure 3:
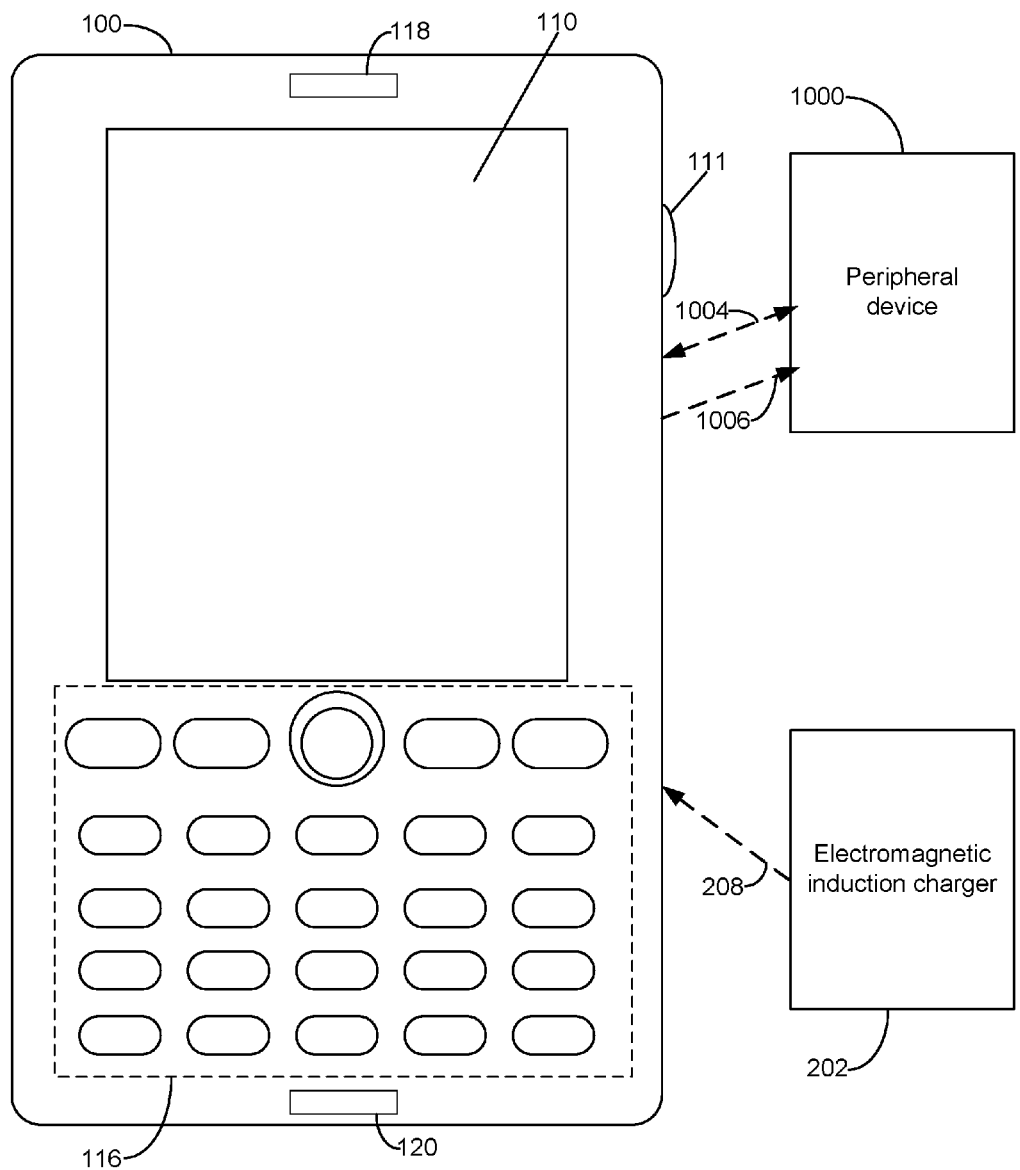
FIG. 3 shows the mobile communication device of FIG. 1, and an example of how it can interact with a peripheral device and an electromagnetic induction charger.

FIG. 3 shows the mobile communication device 100 as in FIG. 2. FIG. 3 also shows a peripheral device 1000, and the electromagnetic induction charger 202 of FIG. 2. The dotted double arrow 1004 indicates that the mobile communication device 100 can be coupled, through the coil 131, to the peripheral device 1000, to communicate (e.g., two-way communication) with the peripheral device 1000. The dotted arrow 1006 indicates that the mobile communication device 100 can be coupled, through its coil 131, to the peripheral device 1000, to provide the peripheral device 1000 an electromagnetic induction charge signal to charge the battery of the peripheral device 1000.

Figure 4:
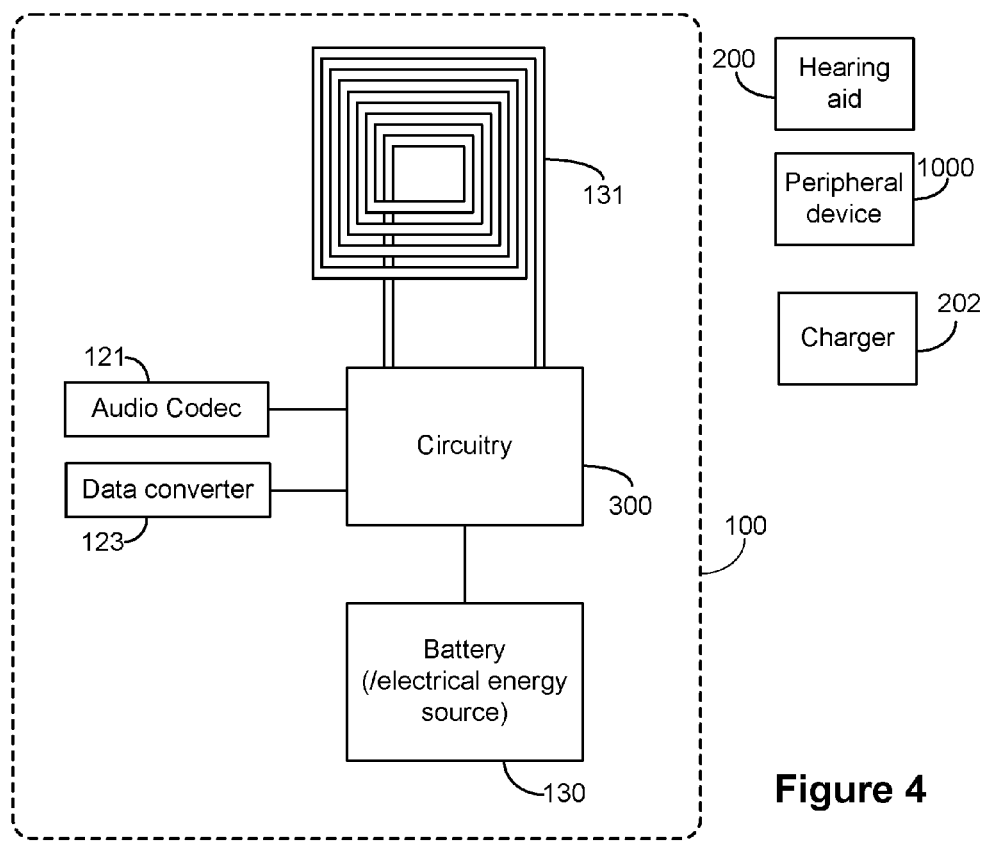
FIG. 4 shows the mobile communication device of FIG. 2 and components thereof.

FIG. 4 shows another block diagram view of the mobile communication device 100, the hearing aid 200 and the electromagnetic induction charger 202. The mobile communication device 100 is shown comprising the battery 130 (which is an example of an electrical energy source) that is electrically connected to circuitry 300, which will be described in more detail below. The circuitry 300 can be controlled by the main processor shown at FIG. 1. Also comprised in the mobile communication device 100 is the audio codec 121 and a data converter 123, also electrically connected to the circuitry 300. The coil 131 is also electrically connected to the circuitry 300. In general, two components are "electrically connected" when an electrical change caused by or affecting one (such as a change in voltage or current) can result in an electrical change in the other, or when an electrical signal sent by one can be received by the other. The two components need not be directly electrically connected (that is, there may be other elements interposed between them), and they may be, but need not be, proximate to one another. "Electrically connected" also includes the concept that components may be physically connected but the electrical circuit connections between them may be broken or completed by, for example, switching circuitry. The coil 131 is shown has having a substantially square geometry; however, the coil can have any other suitable geometry without departing from the scope of the present disclosure. For example, the coil 131 can have a rectangular, circular, or oval geometry, without departing from the scope of the present disclosure. Further, without departing from the scope of the present disclosure, the coil 131 may be part of a flexible circuit board and have a substantially flat geometry; the coil 131 may also be made of multiple windings of conductor wire. Additionally, the mobile communication device may include a magnetic core material disposed adjacent the coil 131, to improve electromagnetic coupling to the hearing aid 200, the peripheral device 1000, and to the charger 200. The magnetic core may include ferromagnetic metals, ferrimagnetic compounds, or combinations thereof. The coil 131, and the magnetic core, can be housed in any part of the mobile communication device 100, including in the battery 130.

Figure 5:
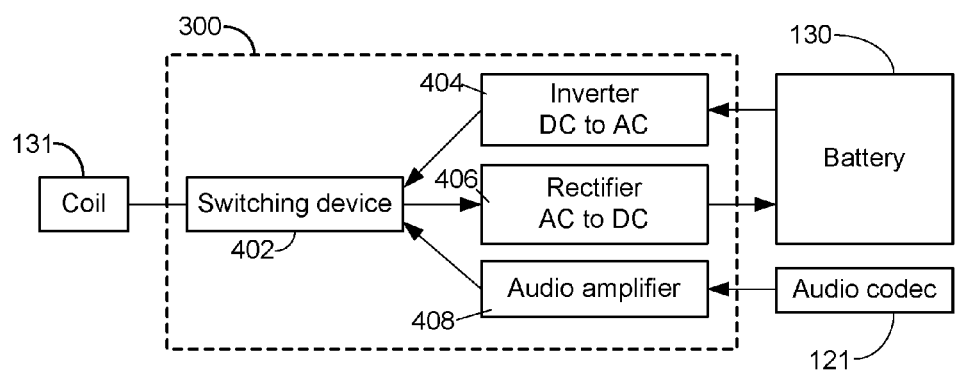
FIG. 5 shows an example of circuitry components that can be part of the mobile communication device of FIG. 2.

FIG. 5 shows a block diagram view of the coil 131, the circuitry 300, the battery 130, and the audio codec 121. In the present example, the coil 131 is electrically connected to the circuitry 300, which includes a switching device 402. The switching device 402 is electrically connected to an inverter 404. The switching device 402 is also electrically connected to charging circuitry that is configurable to charge the battery 130. In FIG. 5, the charging circuitry is represented by a rectifier 406. The switching device 402 is further electrically connected to an audio amplifier 408, which can also be comprised in the circuitry 300. The inverter 404 and the rectifier 406 are electrically connected to the battery 130. The audio amplifier 408 is electrically connected to the audio codec 121. In general, the switching device 402 completes the electrical circuit connections, and may include any kind of switching circuitry. In some embodiments, the switching circuitry 402 operates under the control of another component or control circuitry, such as the processor 102. As described below, the switching device 402 may be responsive to user-entered or automatic commands.

The circuitry 300 is configurable to connect electrically the coil 131 to the battery 130 to charge the battery 130. For example, upon the electromagnetic induction charger 202 of FIG. 2 being activated, it produce a mobile communication device electromagnetic induction charge signal that includes a time-varying magnetic field. Upon the mobile communication device 100 being placed adjacent the electromagnetic induction charger 202, such that the coil 131 of the mobile communication device 100 is exposed to the time-varying magnetic field, the coil 131 will develop therein a time-varying current and voltage. In this scenario, the switching device 402 can be set, either manually, by the user, through a user interface of the mobile communication device 100, or automatically, by a detection and control circuitry of the mobile communication device 100, to provide the time-varying current generated in the coil 131 to the rectifier 406, which can provide at its output a direct current (DC) signal to the battery 130 to charge the battery 130.

The circuitry 300 is also configurable to provide an output signal of the audio codec 121 to the coil 131. The electrical output signal of the audio codec 121 can be input into an audio amplifier 408 to amplify the electrical output signal. In this scenario, the switching device 402 can be set, either manually, by the user, through a user interface of the mobile communication device 100, or automatically, by a detection and control circuitry of the mobile communication device 100, to provide the amplified electrical output signal to the coil 131. As an audio signal input into the audio codec 121 will vary in time, so will the electrical output signal produced by the audio codec 121. As such, the coil 131 will generate a time-varying magnetic field signal in accordance with, that is, as a function of, the time-varying electrical output signal of the audio codec 121. The time-varying magnetic field generated at the coil 131 can be electromagnetically coupled to the hearing aid 200 by bringing the mobile communication device 100 next the hearing aid 200, which is equipped with a telecoil and other circuitry such as, for example, an amplifier, audio processing circuitry, and a speaker (transducer) to output an acoustic signal to the user.

The circuitry 300 is also configurable to electrically connect the battery 130 to the coil 131 in order to generate a time-varying magnetic charge signal that can be used to charge a battery of the hearing aid 200, upon the hearing aid 202 being subjected to the charge signal in question. In this scenario, a DC output of the battery is provided to the inverter 404 that transforms the DC output of the battery into an AC signal. The switching device 402 can be set, either manually, by the user, through a user interface of the mobile communication device 100, or automatically, by a detection and control circuitry of the mobile communication device 100, to provide the AC signal in question to the coil 131, which will generate the time-varying magnetic charge signal that can be coupled to the hearing aid 200 to charge a battery of the hearing aid 200. As will be understood by the skilled worker, the hearing aid 200 has to be equipped with a coil and battery charging circuitry to effect such a hearing aid battery charging scenario.

Figure 6:
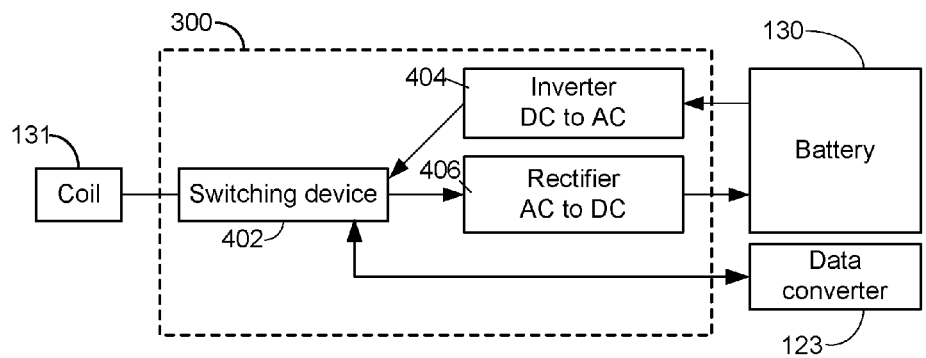
FIG. 6 shows another example of circuitry components that can be part of the mobile communication device of FIG. 2.

FIG. 6 shows a block diagram view of the coil 131, the circuitry 300, the battery 130, and the data converter 123 of FIGS. 1 and 3. In the embodiment of FIG. 6, the data converter 123 is electrically connected to the switching device 402. The circuitry 300 of the present embodiment is configurable to provide an output signal of the data converter 123 to the coil 131. In this scenario, the switching device 402 can be set, either manually, by the user, through a user interface of the mobile communication device 100, or automatically, by a detection and control circuitry of the mobile communication device 100, to provide the electrical output signal of the data converter 123 to the coil 131, and to provide an input signal generated at the peripheral device 1000 of FIG. 3 and detected by the coil 131, to the data converter 123. Although not shown, the circuitry 300 can include an amplifier to amplify signals stemming from the data converter 123, or signals destined to the data converter 123.

Figure 7:
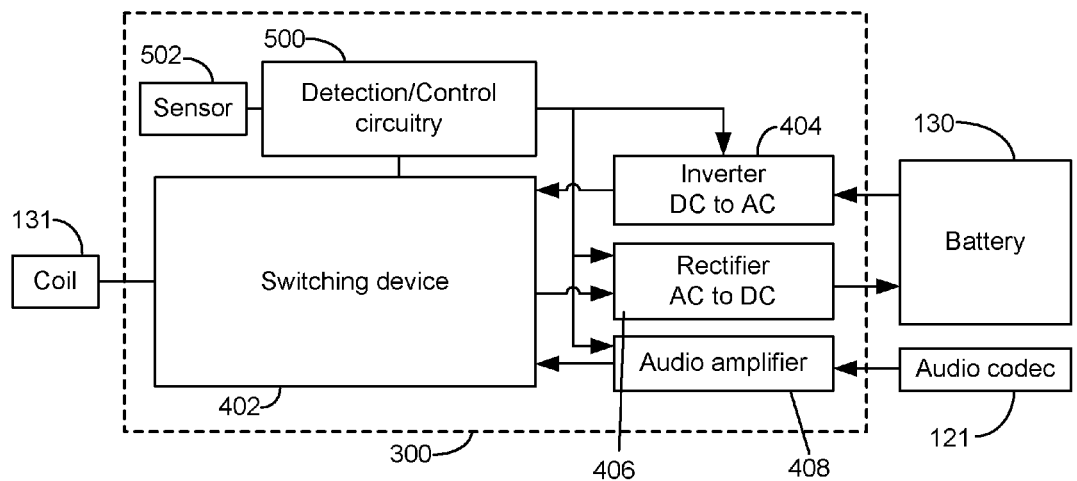
FIG. 7 shows an example of circuitry components that can be part of the mobile communication device of FIG. 2.

FIG. 7 shows another example of the circuitry 300. In the present example, the circuitry 300 includes a sensor 502 connected to detection and control circuitry 500. The sensor 502 can be a Hall effect sensor or any other suitable type of magnetic field sensor, such as a sensor coil distinct from the coil 131. The sensor 502, which is located in vicinity of the coil 131, is electrically connected to the detection and control circuitry 500. As will be described below, the sensor 502 and the detection and control circuit 500 can detect the presence of a mobile communication device electromagnetic charge signal and control the switching device 402, inverter 404, rectifier 406, and audio amplifier 408.

For example, upon the sensor 502 and the detection and control circuitry 500 detecting a mobile communication device electromagnetic induction charge signal, generated, for example, by the electromagnetic induction charger 202 of FIG. 2, the detection and control circuitry 500 can automatically set the switching device 402 to electrically connect the coil 131 to the rectifier 406 and to activate the rectifier 406. By doing so, the detection and control circuitry 500 enables the rectifier 406 to rectify the time-varying electrical signal produced in the coil 131 into a DC current that charges the battery 130 (or any other suitable electrical energy source used to power the mobile communication device 100). Use of a rectifier 406 is just one example of charging circuitry. The concept herein is not limited to the use of any particular charging circuitry or to any particular configuration of rectifier.

In another example, upon the user of the mobile communication device 100 answering a call or placing a call, and upon the sensor 502 and the detection and control circuitry 500 detecting the presence of the hearing aid 200, the detection and control circuitry can automatically set the switching device 402 to electrically connect the coil 131 to the audio amplifier 408 and to activate the audio amplifier 408. By doing so, the detection and control circuitry 500 enables the coil 131 to couple the time varying magnetic field generated in the coil 131 by the electrical output of the audio amplifier 408, to the telecoil of the hearing aid 200.

In yet another example, upon the sensor 502 and the detection and control circuitry 500 detecting the presence of the hearing aid 200 and, the user not placing or receiving a call within a pre-determined time period after the detection of the hearing aid 200, and not using any audio output to the mobile communication device 100, the detection and control circuitry 500 can set the switching device 402 to electrically connect the coil 131 to the inverter 404 and activate the inverter 404. By doing so, the detection and control circuitry 500 enables the inverter 404 to transform a DC signal from the battery 130 into a the time-varying electrical that can be used to charge the battery of the hearing aid 200. To charge the hearing aid 200 in this way, a cradle or support that can receive the mobile communication device 100 and the hearing aid 200 can be used. The cradle or support is such that the coil 131 and the telecoil of the hearing aid are optimally aligned such as to produce optimum electromagnetic inductive coupling. In addition to, or instead of, a cradle, complementary alignment features can be formed on each of the mobile communication device 100 and the hearing aid 200 (or peripheral device 1000). In some embodiments, a strong permanent magnet in the mobile communication device 100 or the hearing aid 200 can be used to facilitate optimum alignment.

Figure 8:
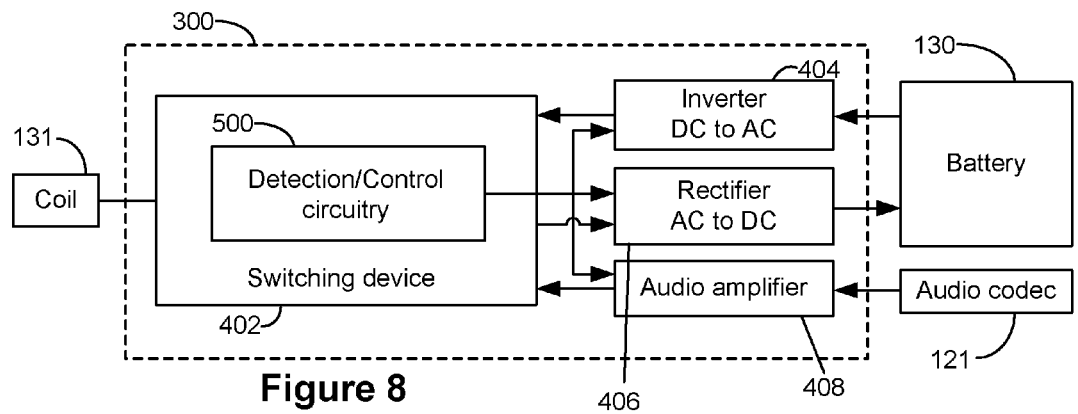
FIG. 8 shows another example of circuitry components that can be part of the mobile communication device of FIG. 2.

FIG. 8 shown another example of the circuitry 300. In this example, the coil 131 itself is coupled to the detection and control circuitry 500, which can be comprised in the switching device 402. The coil 131 and the detection and control circuitry 500 of the example of FIG. 6 can have the same functionality as the sensor 500 and the control circuitry 500 shown in the example of FIG. 7.

Figure 9:
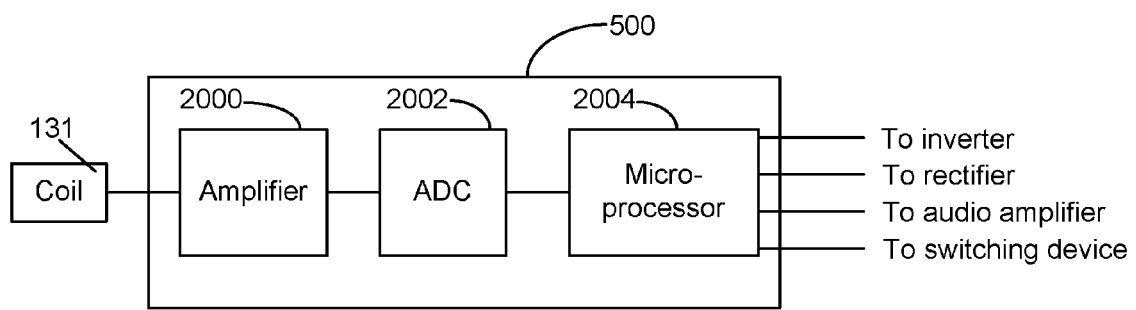
FIG. 9 shows an example of components that can be part of detection and control circuitry of embodiments of the present disclosure.

FIG. 9 shows an example of detection and control circuitry 500 that can be used to detect at time-varying magnetic field signal and to control components (e.g., a switching device, an inverter, a rectifier, and an audio amplifier) as a function of the detected signal. The detection and control circuitry 500 can include an amplifier 2000 electrically connected to the coil 131 (or, to the hall effect sensor 502) to amplify an AC signal generated in the coil 131 (or hall effect sensor 502). The output of the amplifier 2000 is electrically connected to an analog to digital converter (ADC) 2002, which provides an electrical digital signal to a micro-processor 2004. The electrical digital signal provided to the micro-processor 2004 is a function of the signal time-varying magnetic signal detected by the coil 131 (or hall effect sensor 502).

Upon the coil 131 being placed adjacent the electromagnetic induction charger 202 of FIG. 2, the ADC 2002 outputs a pre-determined signal to the micro-processor 2004, which in turn will recognized the pre-determined signal to be associated with the charger 202. The micro-processor 2004 can then set the switching device 402 to provide the signal generated in the coil 131 to the rectifier 406, turn on the rectifier 406 (FIG. 8), and, if need be, turn off the inverter 404 and audio amplifier 408 (both shown at FIG. 8), thereby enabling charging of the battery 130.

Further, in some embodiments, the hearing aid 200 or peripheral device can output a low power time-varying magnetic field signal indicative of the hearing aid 200 or peripheral device, that can be detected by the coil 131. In such a scenario, the ADC 2002 outputs another pre-determined signal that is recognized by the micro-processor 2004 as being that associated with the hearing aid 200 or peripheral device 1000. In the case where it is the hearing aid 200 that is detected, the micro-processor 2004 can set the switching device 402 to electrically connect the coil 131 to the audio amplifier, turn-on the audio amplifier 408 and, if need be, turn off the inverter 404 and the rectifier 406. In the case where it is a peripheral device other than the hearing aid that is detected, the micro-processor 2004 can set the switching device 402 to electrically connect the coil 131 to the data converter 123 (FIG. 6) and, if need be, turn off the inverter 404 and the rectifier 406.

Alternatively, the user can manually control the micro-processor 2004 through a user interface (e.g., a keyboard or touch-screen) of the mobile communication device 100 in order to place or receive a telephone call while having his hearing aid electromagnetically coupled to the mobile communication device.

The user of the mobile communication device 100 can control the micro-processor, through a user interface of the mobile communication device 100, to set the switching device 402 provide the signal generated by the inverter to the coil 131, to turn on the inverter 404 and, if need be, to turn off the rectifier 406 and audio amplifier 408, in order to charge the hearing aid 200 or peripheral device 1000.

Figure 10:
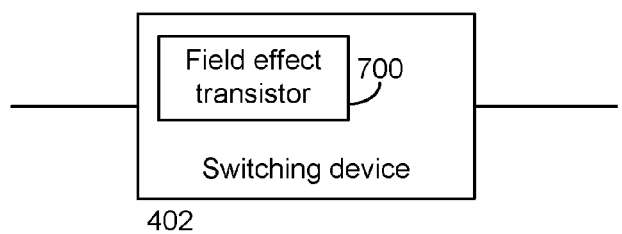
FIG. 10 shows an embodiment of a switching device of the present disclosure.

As mentioned previously, the switching device 402 can include any suitable type of switching circuitry, such as one or more transistors (e.g., field effect transistors). FIG. 10 shows an embodiment of the switching device 402 that includes a field effect transistor 700.

Advantageously, the present disclosure may allow a mobile communication device to provide desirable features to a user by a having a single coil that can communicate with a hearing aid or with an electromagnetic induction charger. By having a single coil to carry out those functions, the mobile communication device can retain a desirable small form factor. As such, a mobile communication device having a small form factor can be HAC-compliant, and be rechargeable by electromagnetic induction.

In the preceding description, for purposes of explanation, numerous details are set forth in order to provide a thorough understanding of the embodiments of the disclosure. However, it will be apparent to one skilled in the art that these specific details are not required in order to practice the disclosure. In other instances, well-known electrical structures and circuits are shown in block diagram form in order not to obscure the disclosure. For example, specific details are not provided as to whether the embodiments of the disclosure described herein are implemented as a software routine, hardware circuit, firmware, or a combination thereof.

Embodiments of the disclosure can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described disclosure can also be stored on the machine-readable medium. Software running from the machine-readable medium can interface with circuitry to perform the described tasks.

The above-described embodiments of the disclosure are intended to be examples only. Alterations, modifications and variations can be effected to the particular embodiments by those of skill in the art without departing from the scope of the disclosure, which is defined solely by the claims appended hereto.

The invention claimed is:

1. A mobile communication device comprising:
an electrical energy source;
a data converter to convert input data into an electrical output signal;
a coil; and
circuitry configurable to electrically connect the coil to the electrical energy source to charge the electrical energy source upon the coil being subjected to a mobile communication device electromagnetic induction charge signal, the circuitry also configurable to provide the electrical output signal of the data converter to the coil, the coil to produce, as a function of the electrical output signal, an electromagnetic induction output signal to be received by a peripheral device upon the coil being inductively coupled to the peripheral device.

2. The device of claim 1 wherein the mobile communication device electromagnetic induction charge signal generates a time-varying electrical signal in the coil, the circuitry including a rectifier to convert the time-varying electrical signal into a direct current electrical signal to charge the electrical energy source.

3. The device of claim 1 wherein the data converter is an audio codec and the peripheral device is a hearing aid.

4. The device of claim 3 wherein the circuitry includes an audio amplifier to amplify the electrical output signal of the audio codec.

5. The device of claim 1 wherein the circuitry is configurable to electrically connect the electrical energy source to the coil to provide a peripheral device electromagnetic induction charge signal to charge the peripheral device upon the peripheral device being inductively coupled to the coil.

6. The device of claim 5 wherein the circuitry includes a DC to AC converter to convert a direct current signal from the electrical energy source into the peripheral device electromagnetic induction charge signal.

7. The device of claim 1 wherein the circuitry includes a switching device to electrically connect the coil to the electrical energy source, and to electrically connect the data converter to the coil.

8. The device of claim 7 wherein the switching device includes a transistor.

9. The device of claim 8 wherein the transistor includes a field-effect transistor.

10. The device of claim 7 wherein the circuitry includes:
detection and control circuitry connected to the coil, the detection and control circuit to generate a detection signal as a function of a detection of the peripheral device or of the mobile communication device electromagnetic induction charge signal, the detection and control circuitry also to control the switching device as a function of the detection signal.

11. The device of claim 7 wherein the circuitry includes:
a sensor to detect the peripheral device and to detect the mobile communication device electromagnetic charge signal; and
detection and control circuitry connected to the sensor, the detection and control circuit to generate a detection signal as a function of a detection of the peripheral device or of the mobile communication device electromagnetic induction charge signal, the detection and control circuitry also to control the switching device as a function of the detection signal.

12. The device of claim 11 wherein the sensor includes a Hall effect sensor.

13. The device of claim 1 wherein the peripheral device is a biometric monitor having recorded thereon biometric data, the circuitry configurable to receive the biometric data from the biometric sensor and to store the biometric data in a memory of the device.

14. A method of coupling a mobile communication device to a hearing aid or to an electromagnetic induction charger, the mobile communication device comprising an electrical energy source, an audio codec, and a coil, the method comprising:
detecting one of a mobile communication device electromagnetic charge signal generated by the electromagnetic induction charger and a hearing aid identification electromagnetic induction signal generated by the hearing aid;
upon detection of the mobile communication device electromagnetic charge signal, electrically connecting the coil to the electrical energy source to provide a charge current to the electrical energy source to charge the electrical energy source, the charge current being a function of an electromagnetic induction current generated in the coil by the mobile communication device electromagnetic charge signal; and
upon detection of the hearing aid identification electromagnetic induction signal, electrically connecting the coil to the audio codec to provide an electrical output signal of the audio codec to the coil to generate an electromagnetic induction output signal to be received by the hearing aid.

* * * * *